United States Patent
Hertweck et al.

(10) Patent No.: US 9,091,276 B2
(45) Date of Patent: Jul. 28, 2015

(54) SLEEVE ELEMENT FOR AXIALLY FIXING A BEARING AND EXHAUST GAS TURBOCHARGER

(75) Inventors: Gernot Hertweck, Fellbach (DE); Johannes Seuffert, Ostfilderm (DE)

(73) Assignee: DAIMLER AG, Stuttgart (DE)

( * ) Notice: Subject to any disclaimer, the term of this patent is extended or adjusted under 35 U.S.C. 154(b) by 736 days.

(21) Appl. No.: 13/200,520

(22) Filed: Sep. 23, 2011

(65) Prior Publication Data

US 2012/0060496 A1 Mar. 15, 2012

Related U.S. Application Data

(63) Continuation-in-part of application No. PCT/EP2010/002058, filed on Mar. 31, 2010.

(30) Foreign Application Priority Data

Apr. 7, 2009 (DE) .......................... 10 2009 016 688

(51) Int. Cl.
  *F04B 17/00* (2006.01)
  *F04D 29/056* (2006.01)
  *F02C 6/12* (2006.01)

(52) U.S. Cl.
  CPC .............. *F04D 29/0563* (2013.01); *F02C 6/12* (2013.01); *F05D 2240/50* (2013.01)

(58) Field of Classification Search
  CPC ......... F02C 6/12; F04D 25/04; F04D 25/045; F04D 29/0563; F05D 2240/50
  USPC ........................ 417/407; 384/448; 248/309.1; 123/559.1–559.3, 560–566
  See application file for complete search history.

(56) References Cited

U.S. PATENT DOCUMENTS

| 4,279,576 | A | 7/1981 | Okano et al. | |
|---|---|---|---|---|
| 4,585,077 | A * | 4/1986 | Bergler | 173/48 |
| 4,721,441 | A | 1/1988 | Miyashita et al. | |
| 6,386,764 | B1 * | 5/2002 | Moore et al. | 384/448 |
| 6,619,838 | B2 * | 9/2003 | Bencini et al. | 378/190 |
| 2003/0011358 | A1 * | 1/2003 | Karpinski | 324/173 |
| 2003/0067160 | A1 * | 4/2003 | Wenck | 285/15 |
| 2003/0185476 | A1 * | 10/2003 | Nakamura et al. | 384/448 |

FOREIGN PATENT DOCUMENTS

| EP | 0 339 601 | 11/1989 |
|---|---|---|
| EP | 0 887 516 | 12/1998 |
| EP | 1 550 812 | 7/2005 |

(Continued)

*Primary Examiner* — Peter J Bertheaud
*Assistant Examiner* — Dnyanesh Kasture
(74) *Attorney, Agent, or Firm* — Klaus J. Bach

(57) ABSTRACT

In a sleeve element for the axially fixing at least one bearing of a rotatable shaft, in particular a shaft of an exhaust gas turbocharger, which sleeve element has at least one through-opening in its circumferential surface, the at least one through-opening has a substantially conical shape in the radial direction of the sleeve element at least in a section thereof, and also in a turbocharger for an internal combustion engine, which comprises a speed detection device and a sleeve element for axially fixing at least one bearing of a shaft of the turbocharger, wherein the sleeve element has at least one opening through which the speed detection device extends and which has a substantially conical shape in the radial direction of the sleeve element at least in a section thereof.

4 Claims, 5 Drawing Sheets

(56) References Cited

FOREIGN PATENT DOCUMENTS

| | | |
|---|---|---|
| EP | 1 972 759 | 9/2008 |
| JP | 2001-295655 | 10/2001 |
| JP | 2001 295655 | 10/2001 |
| JP | 2005 195004 | 7/2005 |
| JP | 2006 153122 | 6/2006 |
| JP | 20063 153122 | 6/2006 |
| JP | 2007 127099 | 5/2007 |
| SU | 211336 | 8/1968 |

\* cited by examiner

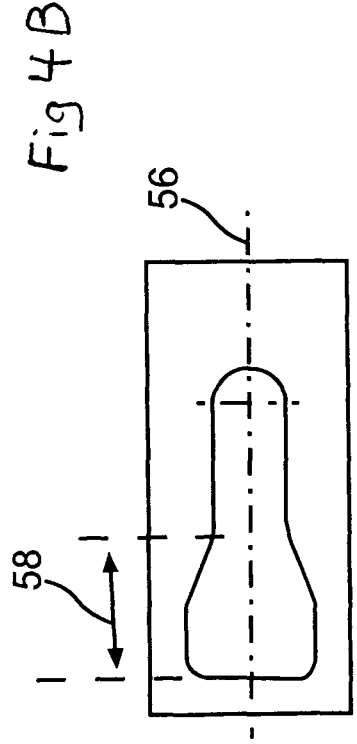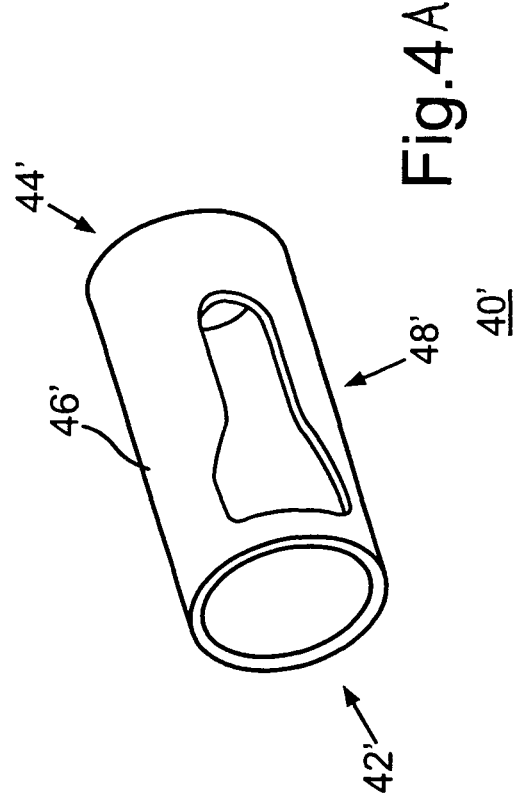

SLEEVE ELEMENT FOR AXIALLY FIXING A BEARING AND EXHAUST GAS TURBOCHARGER

This is a Continuation-In-Part application of pending international patent application PCT/EP2010/002058 filed Mar. 31, 2010 and claiming the priority of German Patent application 10 2009 016 688/2 filed Apr. 7, 2009.

BACKGROUND OF THE INVENTION

The invention relates to a sleeve element for axially fixing a bearing and to an exhaust gas turbocharger for an internal combustion engine including such a sleeve element.

Such sleeve elements and turbochargers are known and shown in FIGS. 1 and 2.

FIG. 1 shows a turbocharger 10 for an internal combustion engine, comprising a turbine housing 12, a bearing housing 14 and a compressor housing 16. The turbine housing 12 accommodates a turbine wheel 18 and the compressor housing 16 accommodates a compressor impeller 20, these two components being connected to each other by a shaft 22. The shaft 22 is mounted in the bearing housing 14 by means of radial bearing bushes 24 and 26. In the axial direction along an axis of rotation 28 of the shaft 22, the radial bearing bushes 24 and 26 are located by means of a spacer sleeve 30. The radial bearing bushes 24 and 26 and the spacer sleeve 30 may be rotatable or non-rotatable. The spacer sleeve 30 is installed coaxial with the shaft 22 between the radial bearing bushes 24 and 26.

In FIG. 2, elements identical to those from FIG. 1 are identified by the same reference numbers. In addition to the turbocharger according to FIG. 1, the turbocharger 1' is provided with a speed sensor 32 which can detect a speed of the shaft 22. The speed sensor 32 may for example be inductive or capacitive, magnetic or optical, or it may detect markings such as flats on the shaft 22, thereby detecting the current speed of the shaft 22 of the turbocharger 10.

A simultaneous use of the speed sensor 32 and a spacer sleeve 30' for the axial location of the radial bearing bushes 24 and 26 is possible if the spacer sleeve 30' is designed to be non-rotating, because a speed of a rotatably mounted spacer sleeve does not have to correspond to a speed of the shaft 22. In addition, the speed of the shaft can only be detected if sufficient unimpeded access in the bearing housing 14 of the turbocharger 10' and a sufficiently large opening in the spacer sleeve 30' are provided.

Known solutions involve an increased assembly effort for such spacer sleeves 30' having at least one opening in combination with speed sensors, which increases the costs for turbochargers provided with such an arrangement.

It is the object of the present invention to provide a sleeve element and a turbocharger of the type referred to above in such a way that costs can be reduced.

SUMMARY OF THE INVENTION

In a sleeve element for the axially fixing at least one bearing of a rotatable shaft, in particular a shaft of a turbocharger, which sleeve element has at least one through-opening in its circumferential surface, the at least one through-opening has a substantially conical shape in the radial direction of the sleeve element at least in a section thereof, and also in a turbocharger for an internal combustion engine, which comprises a speed detection device and a sleeve element for axially fixing at least one bearing of a shaft of the turbocharger, wherein the sleeve element has at least one opening through which the speed detection device extends and which has a substantially conical shape in the radial direction of the sleeve element at least in a section thereof.

According to the invention, a sleeve element for the axial location of at least one bearing of a rotatable shaft, in particular a shaft of a turbocharger has at least one through-opening in its circumferential surface with inclined side walls forming in the radial direction of the sleeve element a substantially conical shape at least in a section thereof. This means that the at least one through-opening is quasi-funnel-shaped, i.e. that the through-opening, in the radial direction of the sleeve element, has a larger diameter on the outside than on the inside.

A radial installation of a speed detection device into a turbocharger is simplified thereby, because the conical design of the through-opening acts as an insertion aid for the installation of the speed sensor.

While a turbocharger with a shaft, a speed detection device and for example two radial bearings are installed, the sleeve element is pushed onto the shaft between the radial bearings and introduced in its complete form into a bearing housing of the turbocharger. As the geometry of the through-opening of the sleeve element is matched to the dimensions of the speed detection device, it has to be ensured that the sleeve element has and maintains a correct position for the installation of the speed detection device while the shaft is being installed into the bearing housing of the turbocharger. The subsequent alignment of the spacer sleeve according to prior art can be achieved only conditionally and involves a greatly increased effort owing to a lack of accessibility.

This assembly process is simplified drastically and therefore cost-effective for the sleeve element according to the invention, because deviations from an ideal position of the sleeve element are corrected by providing that an angular position of the sleeve element is automatically corrected by rotation as a result of the radial installation of the speed detection device. The speed detection device is introduced into the through-opening similar to a funnel. Owing to the conical design, the sleeve element automatically rotates into the correct position and aligns itself to the speed detection device. Additional costly further work is therefore unnecessary, saving time and assembly costs in particular. This also reduces the total costs of a turbocharger with a sleeve element according to the invention.

At this point, it should be noted that the sleeve element according to the invention can easily also be used for the axial location of a single bearing, for example for supporting the bearing against a wall of an associated bearing housing.

If the at least one through-opening has in the axial direction of the sleeve element a substantially conical shape at least in a section thereof, this offers the advantage that deviations from the ideal position of the sleeve element as described above can, if a particular the assembly sequence is adapted, be corrected by providing that the angular position of the sleeve element is corrected automatically by means of the axial installation of the sleeve element. The term "adapted assembly sequence" is in this context to be understood to describe an assembly process in which the sleeve element is initially pre-positioned, followed by the installation of the speed detection device and the completion of the installation of the sleeve element. This embodiment therefore implements not only an installation of the speed detection device, but also an installation of the sleeve element itself, which means a further simplification of the assembly process and thus a further saving in time, resulting in a reduction of the total costs for a turbocharger provided with a sleeve element of this type.

A further reduction of assembly costs and therefore total costs is achieved by providing that, according to a particularly advantageous aspect of the invention, the at least one through-opening is extended to at least one edge of the sleeve element in the axial direction of the sleeve element. This means that the sleeve element comprises at least one through-opening designed according to the invention which is not closed in at least one axial direction, so that the speed detection device can be installed before the installation of the sleeve element. Through the conical through-opening, the spacer sleeve can automatically be turned into the correct position relative to the speed detection device by axial displacement. This embodiment of the invention offers a further reduction of assembly time and thus assembly costs, so that total costs can be reduced further. By means of the sleeve element, an axial location of a bearing can nevertheless be implemented for the optimum bearing-mounting of the shaft of the turbocharger, which is useful because a turbocharger shaft develops very high speeds in operation and therefore requires a highly effective bearing mounting in order to minimize wear and the probability of failure.

In a turbocharger for an internal combustion engine, which comprises a speed detection device and a sleeve element for the axial location of at least one bearing of a shaft of the turbocharger, wherein the sleeve element has at least one through-opening in its circumferential surface through which the speed detection device passes through the sleeve element, the invention provides that the at least one through-opening has in the radial direction of the sleeve element a substantially conical shape at least in a section thereof. Owing to this conical design of the through-opening of the sleeve element, all of the advantages already described in the context of the sleeve element according to the invention can be obtained, i.e. the advantages of a simplified and cost-effective assembly by avoiding further processing, because a quasi-independent orientation of the sleeve element is achieved in the radial direction during the installation of the speed detection device.

In a particularly advantageous embodiment of the turbocharger the at least one through-opening has in the axial direction of the sleeve element a substantially conical shape at least in a section thereof. Owing to this, all of the advantages described above in the context of the sleeve element according to the invention can be transferred to the turbocharger, so that the total costs of the turbocharger can be reduced owing to a further simplification of the assembly process.

The same applies to a further advantageous embodiment in which the at least one through-opening is extended to at least one edge of the sleeve element in the axial direction of the sleeve element. The sleeve element therefore has a through-opening which is not closed in at least one axial direction, so that the speed detection device can be built in before an installation of the sleeve element. For the easy detection of a speed of a shaft of the turbocharger according to the invention, the sleeve element can be rotated into a correct position in a simple way through the through-opening by axial displacement by the speed detection device, allowing an efficient and effective control of the turbocharger for instant adaptation to operating points of the corresponding internal combustion engine. As a result of this efficient and effective adaptability, the fuel consumption and therefore the $CO_2$ emissions of the internal combustion engine can be reduced considerably.

If the sleeve element is located via the at least one through-opening by means of the speed detection device, this arrangement is extremely advantageous in that it makes additional fastening elements and measures obsolete, which reduces the total costs of the turbocharger, because the assembly effort is further reduced. This fixing of the sleeve element by means of the speed detection device in particular relates to a rotational location. For this purpose, a geometry of the through-opening of the sleeve element has to have a particular advantageous relationship with the dimensions of the speed detection device. This means that a contour or a shape of the through-opening is matched to a corresponding external contour or shape of the speed detection device.

In a further aspect of the turbocharger according to the invention, the sleeve element is arranged between two bearings, specifically radial bearings, of the shaft. This results in a relatively large scope for the provision of the through-opening according to the invention, whereby the design and the spatial arrangement of the speed detection device are made significantly more flexible. As a result, package problems can be solved, which is particularly advantageous in space-critical applications, such as in an engine compartment into which a turbocharger according to the invention is installed as a rule.

The invention and advantageous features and details of the invention will become more readily apparent from the following description of three preferred embodiments with reference to the accompanying drawings. The features and feature combinations referred to in the above description and the features and feature combinations referred to in the description of the figures and/or shown in the figures can be used not only in the described combination, but also in other combinations or individually without leaving the scope of the invention.

BRIEF DESCRIPTION OF THE DRAWINGS

FIGS. 4A, 4B are a perspective view and a top view of a sleeve element for the axial location of at least one bearing of a rotatable shaft, the sleeve element having in its circumferential surface a through-opening which is conical both in the radial direction of the sleeve element and in the axial direction.

DESCRIPTION OF PARTICULAR EMBODIMENTS

Figure 1:
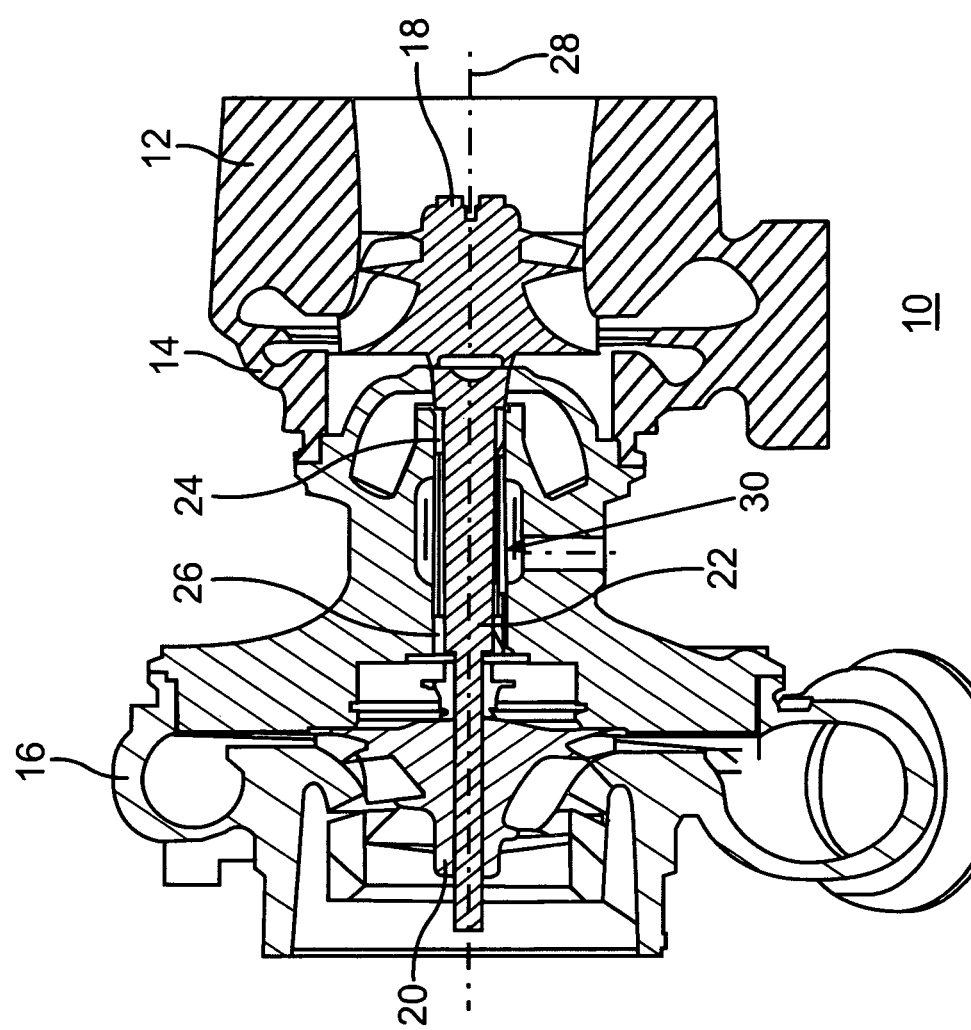
FIG. 1 is a longitudinal section of a turbocharger for an internal combustion engine with a sleeve element for the axial location of two radial bearing bushes according to prior art.
Figure 2:
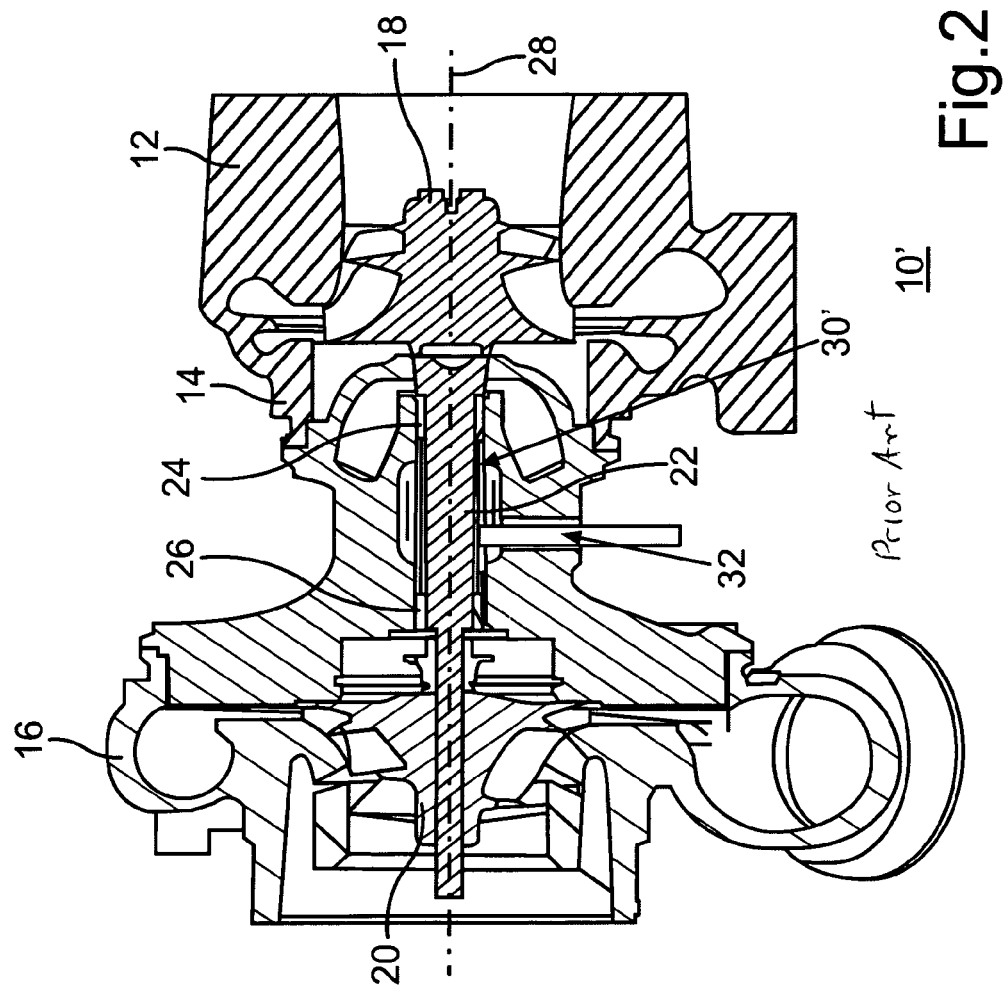
FIG. 2 is a longitudinal section of a turbocharger for an internal combustion engine with a speed detection device and a sleeve element having a through-opening for the axial location of two radial bearing bushes according to prior art.

While FIGS. 1 and 2 show turbochargers with a sleeve element for the axial location of two radial bearing bushes according to prior art, FIGS. 3 to 5 show alternative embodiments of a sleeve elements of this type which are intended to simplify the installation of a speed detection device for a turbocharger.

Figure 3C:
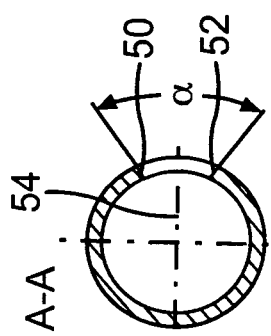
FIGS. 3A, 3B, 3C are in each case a perspective view, a top view and a cross-sectional view of a sleeve element for the axial location of at least one bearing of a rotatable shaft, the sleeve element having in its circumferential surface a through-opening which is conical in the radial direction.
Figure 3B:
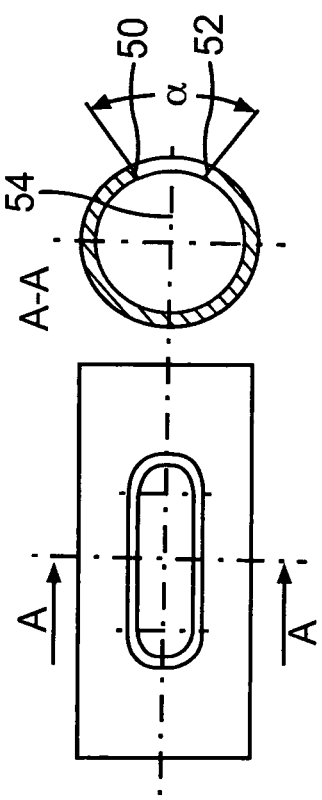
Figure 3A:
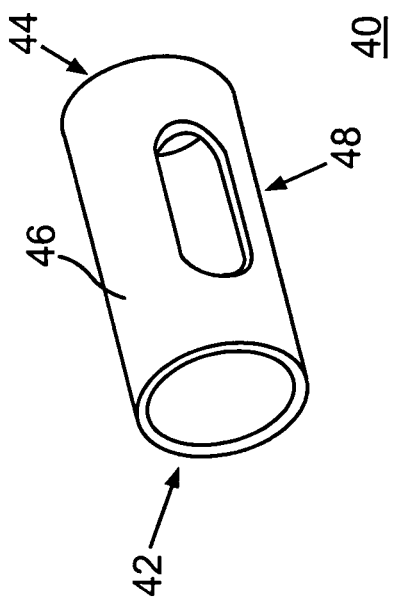

FIGS. 3A to 3C show a sleeve element 40 having a hollow-cylindrical shape. The sleeve element 40 is used for the axial location of at least one bearing of a rotatable shaft, in particular a shaft supported in a bearing housing of a turbocharger. As a rule, however, it is used for the axial location of two bearings of the rotatable shaft in such a way that the sleeve element supports one bearing with one end face 42 and another bearing with its opposite end face 44, thereby axially locating these hearings within the bearing housing.

In its circumferential surface 46, the sleeve element 40 has a through-opening 48 which in a top view essentially has the shape of a slot. The through-opening 48 has the purpose of ensuring that a speed detection device for measuring a speed of the shaft of the turbocharger can penetrate the sleeve element 40.

To simplify the installation of the speed detection device in the radial direction of the sleeve element 40 through a housing opening and also through the opening 48 in the sleeve element 40, the through-opening 48 has a conical shape in the radial direction. This means that the walls 50 and 52 which bound the through-opening 48 enclose in the radial direction an angle of 1.1/2 each with a transverse axis 54 of the sleeve element 40. This creates an insertion aid for the speed detection device which ensures that the sleeve element 40 automatically rotates into a correct angular position in the assembly process which greatly facilitates installation of the speed detection device as the through-opening 48 in the sleeve element 40 is not visible when the speed detection device is being installed.

FIGS. 4A to 4C show, as an alternative to the sleeve element 40 according to FIG. 3, an embodiment of a sleeve element 40', the sleeve element 40' likewise having a through-opening 48' in its circumferential surface 46'. The sleeve element 40' can also be used for the axial location of bearings of a shaft, supporting a bearing each with one end face 42' and the other end face 44'.

As FIGS. 4A and 4B show, the through-opening 48', like the through-opening 48 according to FIG. 3, has a conical shape in the radial direction. In addition, the through-opening 48' has a conical shape in a section thereof in the axial direction along a longitudinal axis 56 of the sleeve element 40' as well. This section is identified by the reference number 58.

Figure 5B:
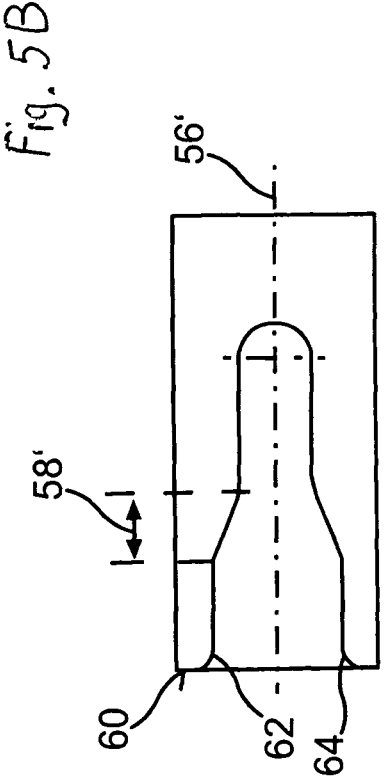
FIGS. 5A, 5B are a perspective view and a top view of a sleeve element for the axial location of at least one bearing of a rotatable shaft, the sleeve element having in its circumferential surface a through-opening which is conical both in the radial and in the axial direction and which is extended to an edge of the sleeve element.
Figure 5A:
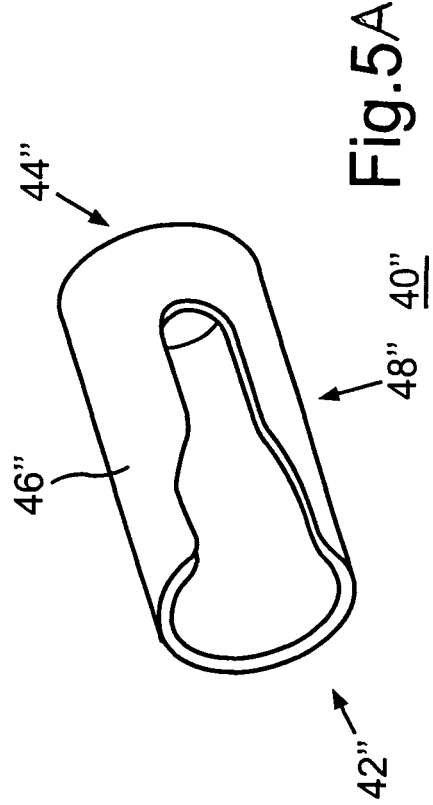

FIGS. 5A and 5B show an embodiment of a sleeve element 40" which is an alternative to those shown in the preceding figures and which can also be used for the axial location of two bearings by means of its end faces 42" and 44".

The sleeve element 40" likewise has a through-opening 48" which is conical in the radial direction of the sleeve element in its circumferential surface 46". In the axial direction, along a longitudinal axis 56' of the sleeve element 40", a section of the through-opening 48" is also conical; this section is identified by the reference number 58'. As FIG. 5 shows, the through-opening 48" extends to an edge 60 of the sleeve element 40", so that the through-opening 48" is not closed in one axial direction. As a result, a speed detection device for a shaft of a turbocharger in which the sleeve element 40" is used for the axial location of the bearings of the shaft can be installed into the turbocharger before the installation of the sleeve element 40". Owing to the conical shape of the through-opening 48", the sleeve element 40" is automatically rotated into its correct position relative to the speed detection device, allowing the easy detection of speeds of the turbocharger shaft.

As shown in FIGS. 5A and 5B, the through-opening 48" has radiused regions 62 to 64 near the edge 60, creating an insertion aid for the installation of the speed detection device in the axial direction as well, for the further simplification of the assembly and thus for further cost reduction.

What is claimed is:

1. An exhaust gas turbocharger (10, 10') for an internal combustion engine, the turbocharger (10, 10') comprising a rotor shaft (22) supported by axially spaced bearings (24, 26) arranged in a bearing housing of the turbocharger (10, 10'), a speed detection device (32) and a sleeve element (30, 30', 40, 40', 40") extending closely around the rotor shaft (22) radially between the rotor shaft (22) and the bearing housing and axially between the spaced bearings (24, 26) for axially fixing the bearings (24, 26) of the rotor shaft (22) of the turbocharger (10, 10'), the sleeve element (30, 30', 40, 40', 40") having a radial through-opening (48, 48', 48") in its circumferential surface (46, 46', 46") through which the speed detection device (32) extends, the through-opening (48, 48', 48") having inclined walls forming an inwardly narrowing funnel extending in the radial direction through the sleeve element (30, 30', 40, 40', 40"), wherein the radial through-opening (48, 48', 48") is elongated in the axial direction of the sleeve element (30, 30', 40, 40', 40") and widens circumferentially toward one end section thereof to facilitate insertion of the speed detection device (32) through the bearing housing surrounding the sleeve element (30, 30', 10, 40', 40"') through the housing into the through-opening in the sleeve element.

2. The exhaust gas turbocharger (10, 10') according to claim 1, wherein the radial through-opening (48, 48', 48") extends to an axial end (60) of the sleeve element (30, 30', 40, 40', 40") in the axial direction of the sleeve element (30, 30', 40, 40', 40") so as to facilitate insertion of the sleeve element with the speed detection device already installed in the turbocharger (10, 10').

3. The exhaust gas turbocharger according to claim 1, wherein the sleeve element (30, 30', 40, 40', 40") is fixed rotationally by the speed detection device (32) extending through through-opening (48, 48', 48").

4. The exhaust gas turbocharger according to claim 1, wherein the sleeve element (30, 30', 40, 40', 40") is arranged axially between two bearings (24, 26) of supporting the shaft (22).

* * * * *